(12) United States Patent
Ohira et al.

(10) Patent No.: US 12,422,141 B2
(45) Date of Patent: Sep. 23, 2025

(54) COMBUSTOR OF GAS TURBINE INCLUDING A FIXTURE THAT ATTACHES A LINER TO AN OUTER WALL HAVING A COOLING AIR PASSAGE

(71) Applicant: KAWASAKI JUKOGYO KABUSHIKI KAISHA, Kobe (JP)

(72) Inventors: Naoya Ohira, Kobe (JP); Yoshihiko Ozaki, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 18/723,678

(22) PCT Filed: Dec. 23, 2022

(86) PCT No.: PCT/JP2022/047648
§ 371 (c)(1),
(2) Date: Jun. 24, 2024

(87) PCT Pub. No.: WO2023/127728
PCT Pub. Date: Jul. 6, 2023

(65) Prior Publication Data
US 2025/0060103 A1 Feb. 20, 2025

(30) Foreign Application Priority Data
Dec. 27, 2021 (JP) .................. 2021-211918

(51) Int. Cl.
*F23R 3/60* (2006.01)
*F23R 3/00* (2006.01)

(52) U.S. Cl.
CPC ............... *F23R 3/002* (2013.01); *F23R 3/60* (2013.01); *F23R 2900/00017* (2013.01)

(58) Field of Classification Search
CPC ... F23R 3/002; F23R 3/60; F23R 2900/00017
See application file for complete search history.

(56) References Cited

U.S. PATENT DOCUMENTS 4,749,298 A * 6/1988 Bundt ...................... F23R 3/60
165/169
4,820,097 A * 4/1989 Maeda .................... F23R 3/002
411/DIG. 2

(Continued)

FOREIGN PATENT DOCUMENTS

WO WO-2016016281 A1 * 2/2016 ............. F01D 25/24

OTHER PUBLICATIONS

English translation of WO 2016016281 (Year: 2016).*

*Primary Examiner* — Thomas P Burke
(74) *Attorney, Agent, or Firm* — Sughrue Mion, PLLC

(57) ABSTRACT

A combustor of a gas turbine according to one aspect of the present disclosure includes: an outer wall surrounding a combustion chamber; a liner located inside the outer wall and facing the combustion chamber; and a fixture that attaches the liner to the outer wall in a state where there is a gap between the outer wall and the liner. The fixture includes: a shaft portion penetrating the outer wall; a head supporting the liner; and a head groove that is located on an outer peripheral surface of the head and includes a first end portion connected to the gap and a second end portion connected to the combustion chamber.

5 Claims, 3 Drawing Sheets

(56) References Cited

U.S. PATENT DOCUMENTS

| | | | |
|---|---|---|---|
| 2003/0123953 A1 | 7/2003 | Razzell | |
| 2016/0186997 A1* | 6/2016 | Sadil | F02C 7/16 |
| | | | 411/347 |
| 2016/0313005 A1* | 10/2016 | Chang | B23K 15/0086 |
| 2017/0205069 A1* | 7/2017 | Tentorio | F23R 3/005 |
| 2018/0283691 A1* | 10/2018 | Corsmeier | F16B 39/06 |
| 2018/0292089 A1* | 10/2018 | Porter | F23R 3/04 |
| 2019/0056110 A1* | 2/2019 | Stevens | F23R 3/286 |
| 2019/0078786 A1 | 3/2019 | Propheter-Hinckley et al. | |
| 2019/0078788 A1* | 3/2019 | Propheter-Hinckley | |
| | | | F23R 3/06 |
| 2023/0288065 A1* | 9/2023 | Singh | F23R 3/002 |
| 2024/0133556 A1* | 4/2024 | Ganiger | F23R 3/002 |
| 2025/0060103 A1* | 2/2025 | Ohira | F23R 3/60 |

\* cited by examiner

COMBUSTOR OF GAS TURBINE INCLUDING A FIXTURE THAT ATTACHES A LINER TO AN OUTER WALL HAVING A COOLING AIR PASSAGE

CROSS REFERENCE TO RELATED APPLICATIONS

This application is a National Stage of International Application No. PCT/JP2022/047648 filed Dec. 23, 2022, claiming priority based on Japanese Patent Application No. 2021-211918 filed Dec. 27, 2021, the entire contents of which are incorporated in their entirety.

TECHNICAL FIELD

The present disclosure relates to a combustor of a gas turbine.

BACKGROUND ART

In recent years, for the purpose of the improvement of fuel efficiency, a combustion temperature in a gas turbine is increasing. To deal with this, a combustor in which a liner is attached inside an outer wall (shell) surrounding a combustion chamber is being devised. Moreover, proposed as a fixture that attaches the liner is a fixture which includes: a head supporting the liner; and a cooling air passage located inside the head (see PTL 1).

CITATION LIST

Patent Literature

PTL 1: U.S. Patent Application Publication No. 2003/0123953, Specification

SUMMARY OF INVENTION

Technical Problem

As described above, the fixture including the cooling air passage has been proposed as the fixture that attaches the liner. However, the entire fixture is not uniformly heated, and especially the head which is exposed to the combustion chamber tends to increase in temperature. An object of the present disclosure is to provide a combustor of a gas turbine which suppresses a temperature increase of especially a head of a fixture that attaches a liner to an outer wall.

Solution to Problem

A combustor of a gas turbine according to one aspect of the present disclosure includes: an outer wall surrounding a combustion chamber; a liner located inside the outer wall and facing the combustion chamber; and a fixture that attaches the liner to the outer wall in a state where there is a gap between the outer wall and the liner. The fixture includes: a shaft portion penetrating the outer wall; a head supporting the liner; and a head groove that is located on an outer peripheral surface of the head and includes a first end portion connected to the gap and a second end portion connected to the combustion chamber.

Advantageous Effects of Invention

The above configuration can provide a combustor of a gas turbine which suppresses a temperature increase of especially a head of a fixture that attaches a liner to an outer wall.

DESCRIPTION OF EMBODIMENTS

Embodiment 1

Figure 1:
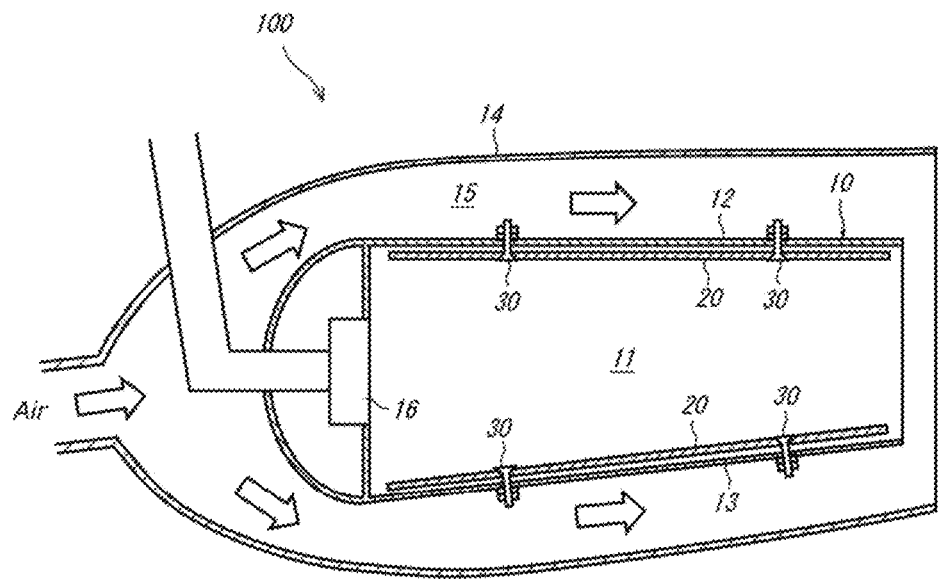
FIG. 1 is a sectional view of a combustor according to Embodiment 1.

First, a combustor 100 according to Embodiment 1 will be described. The combustor 100 according to the present embodiment is used in a gas turbine and is of a so-called annular type. However, the combustor 100 may be of a can type or the like instead of the annular type. FIG. 1 is a sectional view of the combustor 100 at a certain circumferential position. A central axis (not shown) of the combustor 100 is located at a lower side on a paper surface of FIG. 1. A left-right direction on the paper surface of FIG. 1 is an axial direction of the combustor 100. An upper-lower direction on the paper surface of FIG. 1 is a radial direction of the combustor 100 (hereinafter simply referred to as the "radial direction").

As shown in FIG. 1, the combustor 100 according to the present embodiment includes an outer wall 10, a liner 20, and fixtures 30. Hereinafter, these components will be described in order.

Outer Wall

The outer wall 10 is a member surrounding a combustion chamber 11. The outer wall 10 is made of, for example, metal but may be made of a material other than metal. The combustion chamber 11 of the present embodiment is annular. A portion of the outer wall 10 which is located outside the combustion chamber 11 in the radial direction is a so-called outer shell 12. A portion of the outer wall 10 which is located inside the combustion chamber 11 in the radial direction is a so-called inner shell 13. Moreover, the outer wall 10 is surrounded by an annular housing 14, and the outer wall 10 and the combustion chamber 11 are located in an internal space 15 of the housing 14.

A fuel injector 16 is located in the combustion chamber 11. Fuel is injected from the fuel injector 16 to the combustion chamber 11. Air is supplied to the internal space 15 of the housing 14, and part of the supplied air is supplied to the fuel injector 16. Moreover, as shown by white arrows in FIG. 1, part of the rest of the air supplied to the internal space 15 flows through a space between the outer wall 10 and the housing 14.

Liner

The liner 20 is a member which is located inside the outer wall 10 and faces the combustion chamber 11. The liner 20 of the present embodiment is attached to the outer wall 10.

The liner 20 of the present embodiment has a plate shape, but the shape of the liner 20 is not limited to this. Moreover, a material of the liner 20 is not limited, either. Examples of the material of the liner 20 include a ceramic material and a metal material. For example, the material of the liner 20 is a ceramic matrix composite (CMC). The liner 20 is attached to the outer wall 10 by using the fixtures 30 described later. The liner 20 may be an assembly of panels lined up in the circumferential direction to have a tubular shape. The liner 20 may be integrally molded in a tubular shape without being divided into panels lined up in the circumferential direction.

Figure 2:
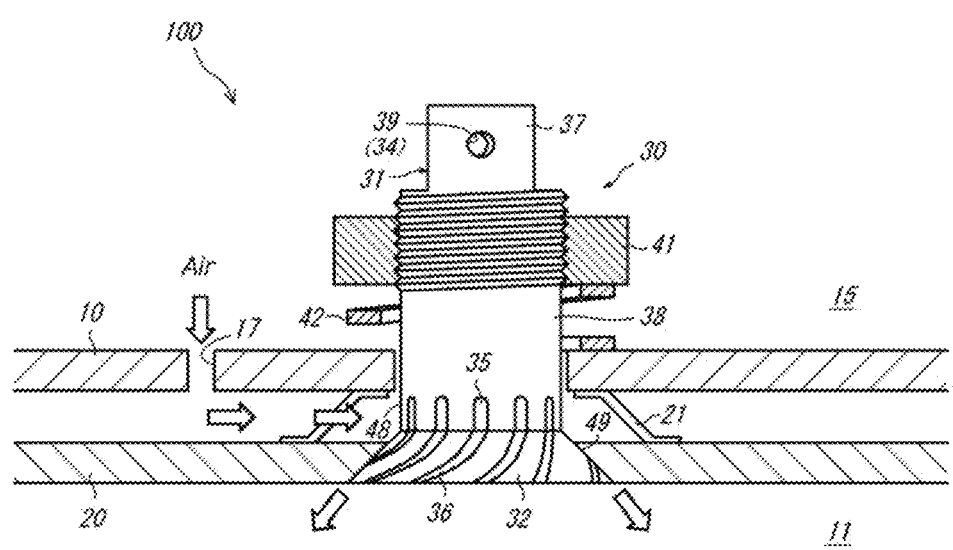
FIG. 2 is an enlarged view showing a fixture of FIG. 1 and its vicinity.

FIG. 2 is an enlarged view showing the fixture 30 and its vicinity. A lower direction on a paper surface of FIG. 2 is a direction toward the combustion chamber 11 (hereinafter referred to as an "inner direction"), and an upper direction on the paper surface of FIG. 2 is a direction away from the combustion chamber 11 (hereinafter referred to as an "outer direction"). The same is true in FIGS. 3 to 5 described later. As shown in FIG. 2, there is a gap between the outer wall 10 and the liner 20. For example, the positions of the outer wall 10 and the liner 20 can be determined by inserting a spacer 21, a spring, or the like between the outer wall 10 and the liner 20. Moreover, for example, without using such means, the positions of the outer wall 10 and the liner 20 may be determined by the fixture 30.

The outer wall 10 includes an outer wall hole 17. As shown by white arrows in FIG. 2, air flows into the gap between the outer wall 10 and the liner 20 through the outer wall hole 17. Part of the air supplied to the fuel injector 16 may flow into the gap between the outer wall 10 and the liner 20. The air having flowed into the gap cools the liner 20. The shape of means (for example, the spacer 21 or the spring) for forming the gap between the outer wall 10 and the liner 20 is not limited, but the gap is formed such that air can flow through the gap.

Fixture

Figures 3, 4:
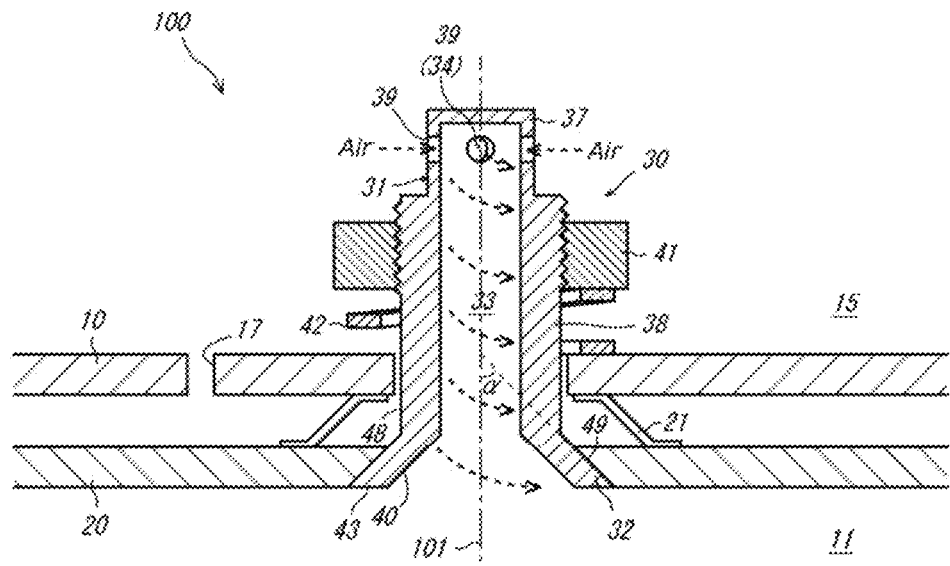
FIG. 3 is a sectional view of the fixture shown in FIG. 2.
FIG. 4 is an enlarged view showing the fixture according to Modified Example of Embodiment 1 and its vicinity.

The fixture 30 is a member that attaches the liner 20 to the outer wall 10. The fixture 30 is made of, for example, metal but may be made of a material other than metal. FIG. 3 is a sectional view of the fixture 30. Strictly speaking, FIG. 3 shows not only a section of the fixture 30 but also the vicinity of the fixture 30. As shown in FIGS. 2 and 3, the fixture 30) includes a shaft portion 31, a head 32, an air passage 33, air inlets 39, shaft grooves 35, and head grooves 36. In the present embodiment, the fixture 30 includes the shaft grooves 35 but does not have to include the shaft grooves 35.

The shaft portion 31 is a portion that penetrates the outer wall 10. The shaft portion 31 includes a columnar outer portion 37 and a columnar inner portion 38. The outer portion 37 is located at an outer side portion of the shaft portion 31, and the inner portion 38 is located at an inner side portion of the shaft portion 31. For example, the outer portion 37 and the inner portion 38 are columnar. A boundary between the outer portion 37 and the inner portion 38 can be set arbitrarily. An outer diameter of the inner portion 38 may be larger than an outer diameter of the outer portion 37. A fixing member is fastened to a portion of the inner portion 38 which is located outside the outer wall 10. For example, there is an external screw at a portion of the inner portion 38 which is located outside the outer wall 10, and a nut 41 is fastened to this external screw. However, the other fastening method may be used. Moreover, a spring 42, a spacer, or the like may be inserted between the nut 41 and the outer wall 10, or nothing may be inserted between the nut 41 and the outer wall 10. The spring 42 of the present embodiment is a coil spring. However, the type of the spring is not limited, and for example, the spring 42 may be a plate spring or the like. The spring 42 applies outward force to the fixture 30 through the nut 41.

The head 32 is a portion supporting the liner 20. The head 32 is located inside the shaft portion 31. An outer diameter of a portion of the head 32 of the present embodiment which is located close to the combustion chamber 11 is larger than an outer diameter of a portion of the head 32 which is located close to the shaft portion 31. For example, the head 32 has a shape including a truncated cone shape or a truncated pyramid shape. When the spring 42 is attached between the nut 41 and the outer wall 10, the spring 42 applies the outward force to the fixture 30, and therefore, a state where the head 32 is in tight contact with the liner 20 is easily maintained. Moreover, as shown in FIG. 2, since the head 32 is exposed to the combustion chamber 11, the head 32 tends to become higher in temperature than the other portion of the fixture 30.

The air passage 33 is a passage through which cooling air flows. As shown in FIG. 3, the air passage 33 is located inside the fixture 30 from the shaft portion 31 to the head 32 and extends along a central axis direction of the fixture 30. Moreover, the air passage 33 is open in the combustion chamber 11. To be specific, the air passage 33 is connected to the combustion chamber 11. The air passage 33 of the present embodiment includes a shape corresponding to the shape of the head 32. For example, each of the shape of the head 32 and the shape of a portion of the air passage 33 which corresponds to the head 32 has a shape including a truncated cone shape or a truncated pyramid shape. In the present embodiment, as compared to when the entire air passage 33 is columnar, the thickness (volume) of the head 32 can be reduced, and therefore, heat is hardly accumulated in the head 32. Moreover, a contact area of the portion of the air passage 33 which corresponds to the head 32 with the cooling air can be increased, and therefore, the temperature of the head 32 hardly increases.

Moreover, an angle $\alpha$ of an outer peripheral surface 49 of the head 32 of the air passage 33 with respect to a central axis 101 of the fixture 30 may be 30° or more and 45° or less. When the angle $\alpha$ of the outer peripheral surface 49 of the head 32 with respect to the central axis 101 of the fixture 30 is set to 30° or more, the head 32 can surely support the liner 20. Moreover, when the angle $\alpha$ of the outer peripheral surface 49 of the head 32 with respect to the central axis 101 of the fixture 30 is set to 45° or less, the area of an end surface 43 (surface opposed to the combustion chamber 11) of the head 32 decreases, and therefore, the temperature increase of the head 32 can be suppressed. An angle of an inner peripheral surface 40 of the head 32 with respect to the central axis 101 of the fixture 30 may be the same as or different from the angle $\alpha$ of the outer peripheral surface 49 of the head 32 with respect to the central axis 101 of the fixture 30.

Moreover, each of the inner peripheral surface 40 and end surface 43 (surface opposed to the combustion chamber 11) of the head 32 may include a thermal barrier coating (TBC) layer on its surface. For example, the TBC layer may be a layer including: a top coating, such as a ceramic coating, for the purpose of a thermal shield effect; and a bond coating, such as an aluminum diffusion coating, for the purpose of oxidation resistance. Since each of the inner peripheral surface 40 and end surface 43 of the head 32 includes the TBC layer on its surface, heat hardly transfers from the combustion chamber 11 to the inner peripheral surface 40 and end surface 43 of the head 32, and therefore, the temperature increase of the head 32 can be suppressed.

The air inlets 39 are air intake ports through which air is taken in the air passage 33. Then, the air inlets 39 can serve as a swirl generator 34 that makes the air flowing through the air passage 33 swirl. The air inlets 39 are located on a side surface of the outer portion 37 of the shaft portion 31. The number of air inlets 39 and the positions of the air inlets 39 are not limited. The air inlet 39 is a portion through which air is taken in the air passage 33 from an outside of the fixture 30. In the present embodiment, the taken air serves as cooling air that cools the fixture 30.

When a supply direction of the air supplied from the air inlet 39 to the air passage 33 is inclined with respect to the radial direction of the air passage 33, as shown by broken line arrows in FIG. 3, the air taken in through the air inlet 39 flows along a wall surface defining the air passage 33 while swirling in the air passage 33. The air inlet 39 extends in a direction perpendicular to the central axis direction of the fixture 30 (i.e., in a direction parallel to the outer wall 10). The air inlet 39 may be inclined with respect to the central axis direction of the fixture 30 such that the air easily flows toward the combustion chamber 11.

When the air flows through the air passage 33 while swirling, the cooling air stays in the air passage 33 for a long period of time, and the air adheres to the wall surface defining the air passage 33. Therefore, the fixture 30 can be effectively cooled. Moreover, since the air can be sent at such an angle as to easily contact the end surface (surface opposed to the combustion chamber 11) of the head 32, the end surface of the head 32 can be effectively cooled. The wall surface defining the air passage 33 may include a groove having a spiral shape, and this groove may serve as the swirl generator 34.

The shaft grooves 35 are grooves located on an outer peripheral surface 48 of the shaft portion 31. In the present embodiment, the fixture 30 includes the shaft grooves 35 but does not have to include the shaft grooves 35. When the fixture 30 includes the shaft grooves 35, as shown in FIG. 2, the shaft grooves 35 of the present embodiment are located on the outer peripheral surface 48 of the shaft portion 31 at regular intervals in the circumferential direction, and the shaft grooves 35 extend linearly in the central axis direction of the shaft portion 31. However, the shaft groove 35 does not have to extend linearly, and for example, may extend in a spiral shape. The number of shaft grooves 35 is not limited. An inner end portion (first end portion) of the shaft groove 35 is connected to the head groove 36 described later. Then, an outer end portion (second end portion) of the shaft groove 35 may be located between the outer wall 10 and the liner 20 or may be located outside the outer wall 10. When the outer end portion of the shaft groove 35 is located between the outer wall 10 and the liner 20, the shaft groove 35 can be made short, and the fixture 30 can be easily machined. When the outer end portion of the shaft groove 35 is located outside the outer wall 10, the contact area of the fixture 30 with the cooling air is made large. Therefore, the fixture 30 can be effectively cooled.

The head grooves 36 are grooves located on the outer peripheral surface 49 of the head 32. The head grooves 36 of the present embodiment are located on the outer peripheral surface 49 of the head 32 so as to correspond to the shaft grooves 35. Moreover, an outer end portion (first end portion) of the head groove 36 is connected to the gap between the outer wall 10 and the liner 20. An inner end portion (second end portion) of the head groove 36 is connected to the combustion chamber 11. Moreover, the outer end portion (first end portion) of the head groove 36 may be connected to the shaft groove 35. When the head grooves 36 are connected to the shaft grooves 35 (i.e., when the fixture 30 includes the shaft grooves 35), the contact area of the fixture 30 with the cooling air is increased. Therefore, the fixture 30 can be effectively cooled. The air having flowed into the gap between the outer wall 10 and the liner 20 is discharged to the combustion chamber 11 through the head grooves 36 or through both of the shaft grooves 35 and the head grooves 36. At this time, the head 32 is cooled by the air flowing through the outer peripheral surface 49.

When the head grooves 36 are located at the above-described head 32 (for example, a truncated cone shape), the head grooves 36 become long, and the contact area of the head 32 with the air becomes large. Therefore, the head 32 can be more effectively cooled. The circumferential positions of the outer and inner end portions of the head groove 36 when viewed in the central axis direction of the head 32 may be different from each other. Moreover, the head grooves 36 may be curved. Even in this case, the same effects can be obtained.

When both of the air inlets 39 and the head grooves 36 are used, the inside, end surface, and outside of the head 32 can be cooled at the same time. Therefore, the head 32 can be effectively cooled. Moreover, when the direction of the air flowing through the air inlet 39 is along the direction of the air flowing through the head groove 36, the air flowing through these hardly stays in the vicinity of the air passage 33, and therefore, the cooling air can be stably sent to the head 32. For example, the air flowing through the air inlet 39 and the air flowing through the head groove 36 may be made to swirl.

The above embodiment has described a case where the circumferential positions of the outer and inner end portions of the head groove 36 are different from each other, and the head grooves 36 are curved. However, the shape of the head groove 36 is not limited to the above. For example, as shown in FIG. 4, the circumferential positions of the outer and inner end portions of the head groove 36 when viewed in the central axis direction of the head 32 may be the same as each other, and the head grooves 36 may extend linearly. Moreover, the number of head grooves 36 is not limited.

Embodiment 2

Figure 5:
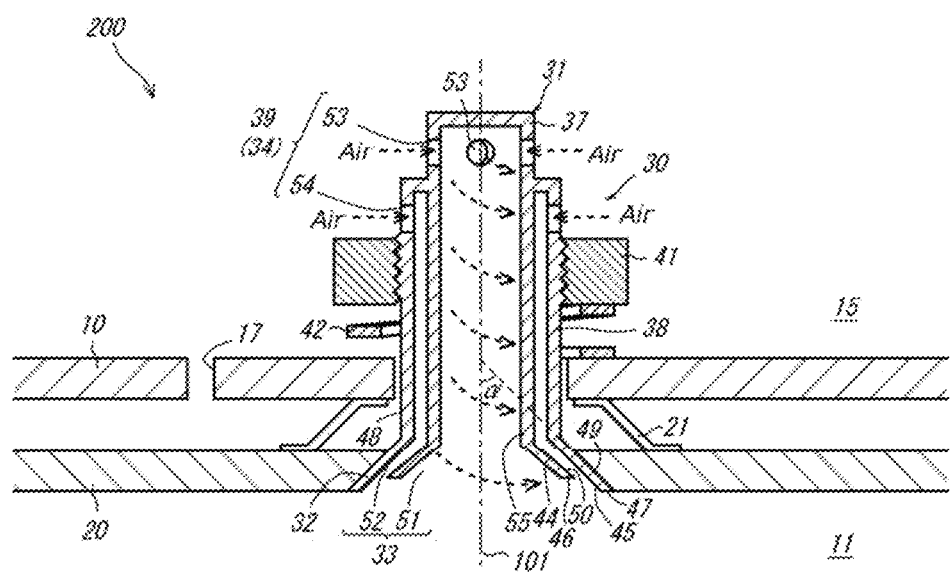
FIG. 5 is a sectional view of the fixture of the combustor according to Embodiment 2.

Next, a combustor 200 according to Embodiment 2 will be described. FIG. 5 is a sectional view of the combustor 200 according to Embodiment 2 and is a diagram corresponding to FIG. 3 of Embodiment 1. The configuration of the air passage 33 of the fixture 30 of the combustor 200 according to the present embodiment is different from that of the combustor 100 according to Embodiment 1. Other than the above, the combustor 200 according to the present embodiment is basically the same as the combustor 100 according to Embodiment 1. Hereinafter, the air passage 33 of the combustor 200 according to the present embodiment will be described.

As shown in FIG. 5, the air passage 33 of the present embodiment has a dual structure and includes an inner passage 51 and an outer passage 52.

The inner passage 51 is a passage extending in the central axis direction of the fixture 30. Herein, the air inlets 39 of the present embodiment include: inner air inlets 53 connected to the inner passage 51; and outer air inlets 54 connected to the outer passage 52. The inner air inlets 53 connected to the inner passage 51 are located on a side surface of the outer portion 37 of the shaft portion 31, and the number of inner air inlets 53 is not limited. When central axes of the inner air inlets 53 are inclined with respect to the radial direction of the inner passage 51, the air taken in from the inner air inlets 53 flows through the inner passage 51 while swirling.

The outer passage 52 is a passage surrounding the entire inner passage 51 or part of the inner passage 51. The inner passage 51 and the outer passage 52 are separated from each other by a cylindrical internal wall 55. The outer passage 52 may be formed so as to correspond to part of the inner passage 51. The outer air inlets 54 connected to the outer passage 52 are located on a side surface of the inner portion 38 of the shaft portion 31, and the number of outer air inlets 54 is not limited. When central axes of the outer air inlets 54 are inclined with respect to the radial direction of the outer passage 52, the air taken in through the outer air inlets 54 flows through the outer passage 52 while swirling.

The above embodiment has described a case where the air passage 33 has the dual structure. However, the air passage 33 may include only the outer passage 52.

As above, the fixture 30 is cooled by the air flowing through the outer passage 52 of the air passage 33 of the present embodiment. Therefore, the entire fixture 30 can be effectively cooled.

A passage area of an end portion of the outer passage 52 which is located close to the combustion chamber 11 may be smaller than a passage area of an end portion of the inner passage 51 which is located close to the combustion chamber 11. Moreover, the passage area of the end portion of the outer passage 52 which is located close to the combustion chamber 11 may be smaller than a passage area of the air inlet 39 (outer air inlet 54) of the outer passage 52. Since the flow velocity of the air is maintained at the end portion of the outer passage 52 which is located close to the combustion chamber 11, the air can be made to flow in the vicinity of the wall surface defining the air passage 33, at a portion of the air passage 33 which corresponds to the head 32. As a result, the head 32 can be effectively cooled.

In the above embodiment, each of the angle α of the outer peripheral surface 49 of the head 32 of the inner passage 51 with respect to the central axis 101 of the fixture 30 and the angle α of an outer peripheral surface 50 of the head 32 of the outer passage 52 with respect to the central axis 101 of the fixture 30 may be 30° or more and 45° or less. Moreover, each of an inner peripheral surface 44 and end surface 46 (surface opposed to the combustion chamber 11) of the head 32 of the inner passage 51 and an inner peripheral surface 45 and end surface 47 (surface opposed to the combustion chamber 11) of the head 32 of the outer passage 52 may include a thermal barrier coating (TBC) layer on its surface.

CONCLUSION

A first aspect disclosed in the present description is a combustor of a gas turbine, the combustor including: an outer wall surrounding a combustion chamber; a liner located inside the outer wall and facing the combustion chamber; and a fixture that attaches the liner to the outer wall in a state where there is a gap between the outer wall and the liner, wherein the fixture includes a shaft portion penetrating the outer wall, a head supporting the liner, and a head groove that is located on an outer peripheral surface of the head and includes a first end portion connected to the gap and a second end portion connected to the combustion chamber.

According to this configuration, the head can be cooled by the air flowing through the head groove. As a result, the temperature increase of the head can be suppressed.

A second aspect disclosed in the present description is the combustor according to the first aspect, wherein the liner includes a ceramic matrix composite.

According to this configuration, the heat resistance of the combustor can be improved.

A third aspect disclosed in the present description is the combustor according to the first or second aspect, wherein: the fixture further includes a shaft groove located on an outer peripheral surface of the shaft portion; and a first end portion of the shaft groove is connected to the head groove.

According to this configuration, the cooling air flows through not only the head groove but also the shaft groove, and therefore, the contact area with the air can be increased. Therefore, the fixture can be effectively cooled.

A fourth aspect disclosed in the present description is the combustor according to any one of the first to third aspects, wherein the head has a truncated cone shape.

According to this configuration, the length of the head groove in the fixture including the head having a truncated cone shape increases. Therefore, the head can be effectively cooled.

A fifth aspect disclosed in the present description is the combustor according to any one of the first to fourth aspects, wherein circumferential positions of the first and second end portions of the head groove when viewed in a central axis direction of the head are different from each other.

According to this configuration, since the contact area of the head with the cooling air increases, the head can be effectively cooled.

A sixth aspect disclosed in the present description is the combustor according to any one of the first to fifth aspects, wherein the head groove is curved.

According to this configuration, since the contact area of the head with the cooling air increases, the head can be effectively cooled.

A seventh aspect disclosed in the present description is the combustor according to any one of the first to sixth aspects, wherein: the fixture includes an air passage located inside the fixture and connected to the combustion chamber and an air inlet through which air is taken in the air passage; and a direction of the air flowing through the head groove is along a direction of the air flowing through the air passage.

According to this configuration, since the air flowing through the head groove and the air passage hardly stays in the vicinity of the air passage, the cooling air can be stably sent to the head.

An eighth aspect disclosed in the present description is the combustor according to any one of the first to sixth aspects, wherein: the fixture includes an air passage located inside the fixture and connected to the combustion chamber and a swirl generator that makes air flowing through the air passage swirl; and each of a direction of the air flowing through the head groove and a direction of the air flowing through the air passage is a swirl direction.

According to this configuration, since the air flowing through the head groove and the air passage hardly stays in the vicinity of the air passage, the cooling air can be stably sent to the head.

The invention claimed is:

1. A combustor of a gas turbine, the combustor comprising:
   an outer wall surrounding a combustion chamber;
   a liner located inside the outer wall and facing the combustion chamber; and
   a fixture that attaches the liner to the outer wall in a state where there is a gap between the outer wall and the liner, wherein the fixture includes
- a shaft portion penetrating the outer wall,
- a head supporting the liner, and
- a head groove that is located on an outer peripheral surface of the head and includes a first end portion connected to the gap and a second end portion connected to the combustion chamber,
- an air passage located inside the fixture and connected to the combustion chamber,
- an air inlet through which air is taken in the air passage, and
- a swirl generator that makes air flowing through the air passage swirl; and
- circumferential positions of the first end portion and the second end portion of the head groove when viewed in a central axis direction of the head are different from each other such that the air flowing through the head groove swirls along the outer peripheral surface of the head and into the combustion chamber.

2. The combustor according to claim 1, wherein the liner includes a ceramic matrix composite.

3. The combustor according to claim 1, wherein:
the fixture further includes a shaft groove located on an outer peripheral surface of the shaft portion; and
a first end portion of the shaft groove is connected to the head groove.

4. The combustor according to claim 1, wherein the head has a truncated cone shape.

5. The combustor according to claim 1, wherein the head groove is curved.

* * * * *